United States Patent [19]
Esch et al.

[11] Patent Number: 6,064,416
[45] Date of Patent: May 16, 2000

[54] LINEAR TRANSLATION SYSTEM FOR USE IN A LASER IMAGING SYSTEM

[75] Inventors: Jay A. Esch, River Falls, Wis.; Timothy S. Vraa, Apple Valley, Minn.; Yun Zhong Li, Woodbury, Minn.; Paul C. Schubert, Marine on St. Croix, Minn.; James E. Steffen, Woodbury, Minn.

[73] Assignee: Eastman Kodak Company, Rochester, N.Y.

[21] Appl. No.: 08/939,420

[22] Filed: Sep. 29, 1997

[51] Int. Cl.⁷ ................................................. B41J 25/304
[52] U.S. Cl. ......................... 347/225; 347/262; 347/264; 400/11; 400/320; 400/336
[58] Field of Search ................................. 347/225, 262, 347/264, 104; 346/138; 358/474; 395/117; 400/11, 320, 336

[56] References Cited

U.S. PATENT DOCUMENTS

| | | | |
|---|---|---|---|
| 3,750,189 | 7/1973 | Fleischer | 347/137 |
| 4,040,096 | 8/1977 | Starkweather | 358/302 |
| 4,475,787 | 10/1984 | Starkweather | 359/211 |
| 4,496,209 | 1/1985 | Itoh et al. | 359/206 |
| 4,606,601 | 8/1986 | Starkweather | 359/211 |
| 4,625,315 | 11/1986 | Lemberger et al. | 372/38 |
| 4,853,709 | 8/1989 | Stein et al. | 347/259 |
| 4,910,601 | 3/1990 | Gerlach | 358/474 |
| 4,936,643 | 6/1990 | Beiser | 359/212 |
| 5,063,292 | 11/1991 | Brueggemann | 250/236 |
| 5,114,217 | 5/1992 | Beiser | 359/216 |
| 5,196,957 | 3/1993 | Brueggemann | 359/206 |
| 5,208,701 | 5/1993 | Maeda | 359/574 |
| 5,227,910 | 7/1993 | Khattak | 359/211 |
| 5,235,467 | 8/1993 | Nagamachi | 359/742 |
| 5,247,383 | 9/1993 | Brueggemann | 359/197 |
| 5,455,708 | 10/1995 | Harris et al. | 359/226 |
| 5,475,412 | 12/1995 | Wong | 347/104 |
| 5,486,694 | 1/1996 | Harris | 250/236 |
| 5,498,869 | 3/1996 | Appel et al. | 250/236 |
| 5,517,330 | 5/1996 | Maeda | 358/481 |
| 5,566,016 | 10/1996 | Lee | 359/206 |
| 5,596,190 | 1/1997 | Li et al. | 250/236 |
| 5,610,751 | 3/1997 | Sweeney et al. | 359/197 |
| 5,740,339 | 4/1998 | Ohyama | 395/117 |

FOREIGN PATENT DOCUMENTS

| | | |
|---|---|---|
| 0 373 262 A1 | 6/1990 | European Pat. Off. ......... H04N 1/06 |
| 0 740 454 A2 | 10/1996 | European Pat. Off. . |
| 9 766 116 A2 | 4/1997 | European Pat. Off. . |
| 3634819 A1 | 4/1988 | Germany ........................ B41J 29/02 |
| 2 207 773 | 2/1989 | United Kingdom . |

OTHER PUBLICATIONS

Copy of PCT International Search Report mailed on Dec. 14, 1998 (3 pages).

Beiser, *Optical Scanners*, VHC Publishers, Inc., New York, NY, Copyright 1995, pp. 337–368.

Beiser, "Design Equations for a Polygon Laser Scanner", *Beam Deflection and Scanning Technologies*, vol. 1454, SPIE Proceedings Feb. 25–Mar. 1, 1991, SPIE Publishers, Bellingham, Washington, pp. 60–66.

Beiser, "Resolution of Laser Scanners", *Optical Engineering*, vol. 23, No. 3, May/Jun. 1984, pp. 266–268.

*Primary Examiner*—N. Le
*Assistant Examiner*—Hai C. Pham
*Attorney, Agent, or Firm*—William F. Noval

[57] ABSTRACT

A linear translation system for use in a laser imaging system. The linear translation system includes a base member including a pair of longitudinally extending guide rails positioned parallel to each other. A carriage mechanism is carried by the base member, wherein the carriage mechanism is slidably coupled to the guide rails using a three position kinematic design. A rotary to linear motion mechanism is coupled to the carriage mechanism which slidably moves the carriage mechanism along the guide rails. A laser imaging assembly is coupled to the carriage mechanism.

40 Claims, 6 Drawing Sheets

LINEAR TRANSLATION SYSTEM FOR USE IN A LASER IMAGING SYSTEM

BACKGROUND OF THE INVENTION

The present invention relates generally to linear translation systems and laser imaging systems incorporating such systems. In particular, the present invention relates to a linear translation system for use in an internal drum type optical scanner assembly suitable for use in a medical imaging system.

Laser imaging systems are commonly used to produce photographic images from digital image data generated by magnetic resonance (MR), computed tomography (CT) or other types of scanners. Systems of this type typically include a continuous tone laser imager for exposing the image on photosensitive film, a film processor for developing the film, and an image management subsystem for coordinating the operation of the laser imager and the film processor.

The digital image data is a sequence of digital image values representative of the scanned image. Image processing electronics within the image management subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors), for exposure of the image onto the film.

The linear translation system provides for movement of the laser scanning system in a direction perpendicular to the scanning direction, such that a full image may be scanned on a piece of photosensitive film. Linear translation systems are found in products such as plotters, printers, flatbed scanners, and internal drum laser scanners.

Traditional linear translation systems include three main components, a stationary member, a moving member (e.g., a carriage), and a drive mechanism. In a linear translation system where rigidity, positional accuracy, and high load carrying capacity are required, lead screw mechanisms are preferred as the drive mechanism. Belts and cable systems are used in systems characterized by flexibility, light loads, and low costs, such as plotters and ink jet printers.

Known linear translation systems are usually designed for positional repeatability. Although such systems work well for positional repeatability type scanning operations, such linear translation systems were not designed to minimize velocity variation which is critical to a "continuous" scan system or a continuous "step-scan" system wherein the linear translation system moves or steps the laser scanning system as the laser scanning system scans a scan line across the photosensitive film. In continuous laser scanning applications, velocity variations cause the scan lines to be unevenly spaced and result in a variety of image artifacts on the photosensitive film.

SUMMARY OF THE INVENTION

The present invention is directed to a linear translation system for use in a laser imaging system. The linear translation system may be used in an internal drum-type scanner assembly which is capable of producing images which meet the image-quality requirements of the medical imaging industry. Further the novel configuration of the linear translation system in accordance with the present invention minimizes velocity variation allowing an image to be continuously scanned or simultaneously stepped and scanned for exposure of the image on a photosensitive film.

One exemplary embodiment in accordance with the present invention provides a linear translation system for use in a laser imaging system. The linear translation system includes a base member including a pair of longitudinally extending guide rails positioned parallel to each other. A carriage mechanism is carried by the base member, wherein the carriage member is slidably coupled to the guide rails using a three position kinematic design. A rotary to linear motion mechanism is coupled to the carriage mechanism which slidably moves the carriage mechanism along the guide rails. A laser imaging assembly is coupled to the carriage mechanism.

The three position kinematic design may include the carriage mechanism contacting the guide rails at five points. In one exemplary application, the carriage mechanism includes a first bearing surface, a second bearing surface, and a third bearing surface for contacting the guide rails. The first bearing surface, the second bearing surface, and the third bearing surface may include a lubricious polymeric coating. The first bearing surface and the second bearing surface are V-shaped. The pair of guide rails includes a first guide rail and a second guide rail wherein the first bearing surface and the second bearing surface contact the first guide rail and wherein the third bearing surface contacts the second guide rail. The third bearing surface is flat and contacts the second guide rail at a single point.

The rotary to linear motion mechanism may include a motor having a rotating shaft, a flywheel mechanism, and a capstan positioned between the shaft and the flywheel mechanism. The capstan is coupled to the motor shaft and tensioned against the flywheel. A mechanism may be provided for tensioning the capstan against the flywheel mechanism. In one exemplary application, the base member further comprises a base bracket. The system further comprises a motor mount, wherein the motor is mechanically coupled to the motor mount and the motor mount is pivotally coupled to the base bracket (pivots with respect to the base bracket). An extension mechanism is coupled between the motor mount and the base bracket which tensions the capstan against the flywheel. A compression mechanism is coupled between the motor and the motor mount. The capstan may comprise a shaft and a polymeric coating on at least a portion of the shaft.

A drive pulley extends from the flywheel. The drive pulley may be integral to the flywheel. A cable system operably couples the drive pulley to the carriage mechanism. The cable system includes a relatively stiff cable with a lubricious coating.

In one application, the laser imaging assembly scans a scan line across a scan surface generally perpendicular to the movement of a carriage mechanism. The motor moves the carriage mechanism during each scan line. The motor may be a stepping motor, wherein the stepping motor moves the carriage mechanism a plurality of micro-steps during each scan line.

In another embodiment, the present invention includes an internal drum type scanner assembly for use in a laser imaging system. The scanner assembly includes a frame having a first end, a second end, and an internal drum-shaped surface for positioning a piece of photosensitive film thereon. A linear translation system is positioned above the scanning surface and coupled to the frame. The linear translation system comprises a base member including a pair of parallel guide rails extending longitudinally between the first end and the second end. A carriage mechanism is carried by the base member, wherein the carriage mechanism is slidably coupled to the guide rails using a kinematic design having five contact points. A rotary to linear motion mechanism is coupled to the carriage mechanism which precisely moves the carriage mechanism along the guide rails. A laser imaging assembly is provided, wherein the laser imaging assembly is coupled to the carriage mechanism between the carriage mechanism and the scanned surface. The laser imaging assembly scans a scan line across the photosensitive film in an image-wise pattern, wherein the scan line is generally perpendicular to the movement of the carriage mechanism.

A pair of guide rails extend between a first base end bracket and a second base end bracket. The first base end bracket and the second base end bracket each have a pair of support pins extending therefrom. The first end and the second end each include a pair of slots for slidable receipt of the support pins for supporting the linear translation system from the frame.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other objects of the present invention and many attendant advantages of the present invention will be readily appreciated as the same becomes better understood by reference to the following detailed description when considered in connection with the accompanying drawings, in which like reference numerals designate like parts throughout the figures.

DETAILED DESCRIPTION OF THE PREFERRED EMBODIMENTS

Figure 1:
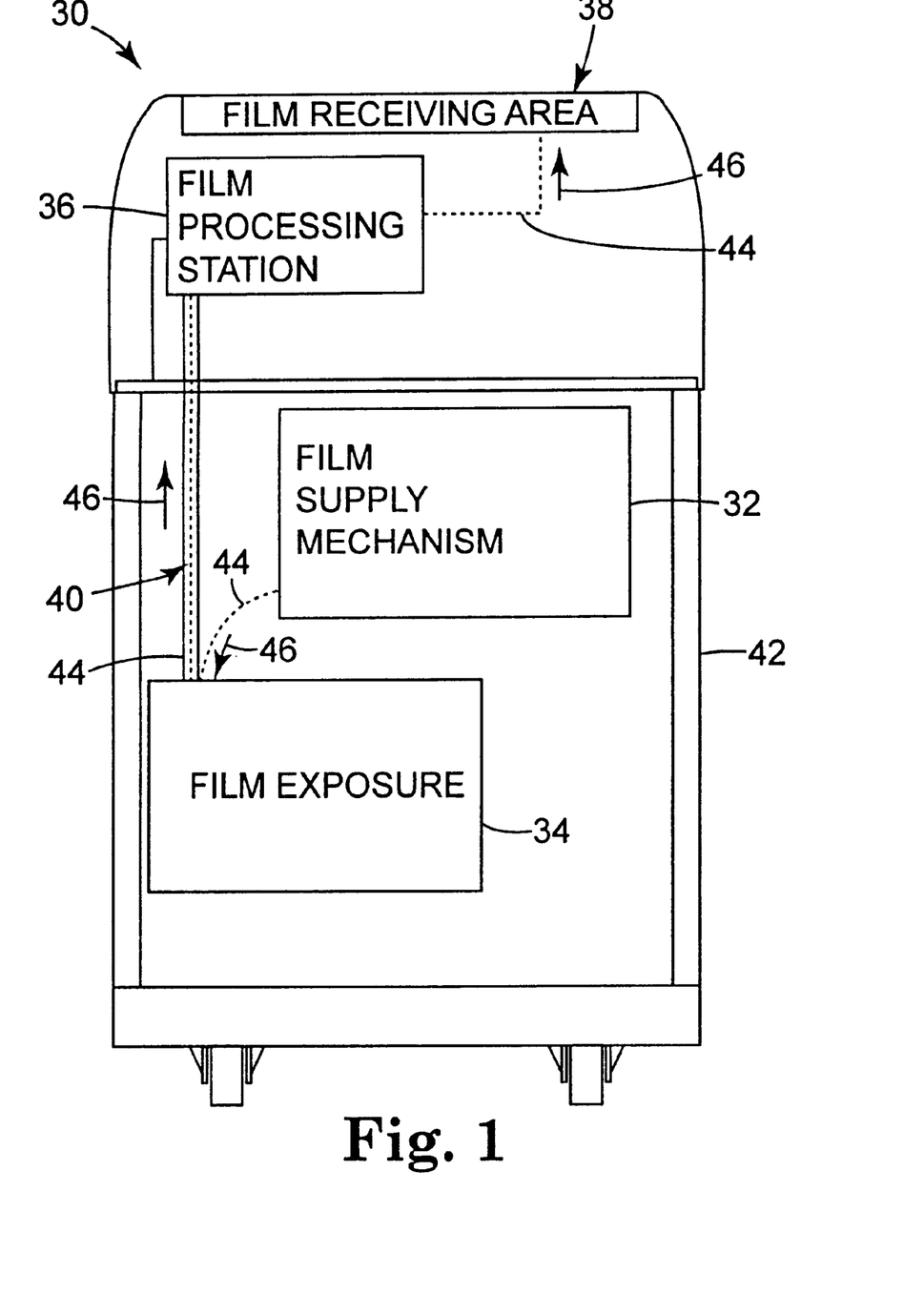
FIG. 1 is an elevational diagram of a laser imaging apparatus in accordance with the present invention.

FIG. 1 is an elevational diagram illustrating an exemplary embodiment of a laser imaging system 30 suitable for use in the medical imaging industry including a linear translation system, in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism (not shown) for feeding a piece of film along film transport path 44 into the film exposure assembly 34 for exposing the desired image on the photosensitive film using the optical scanner assembly in accordance with the present invention. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

Figure 2:
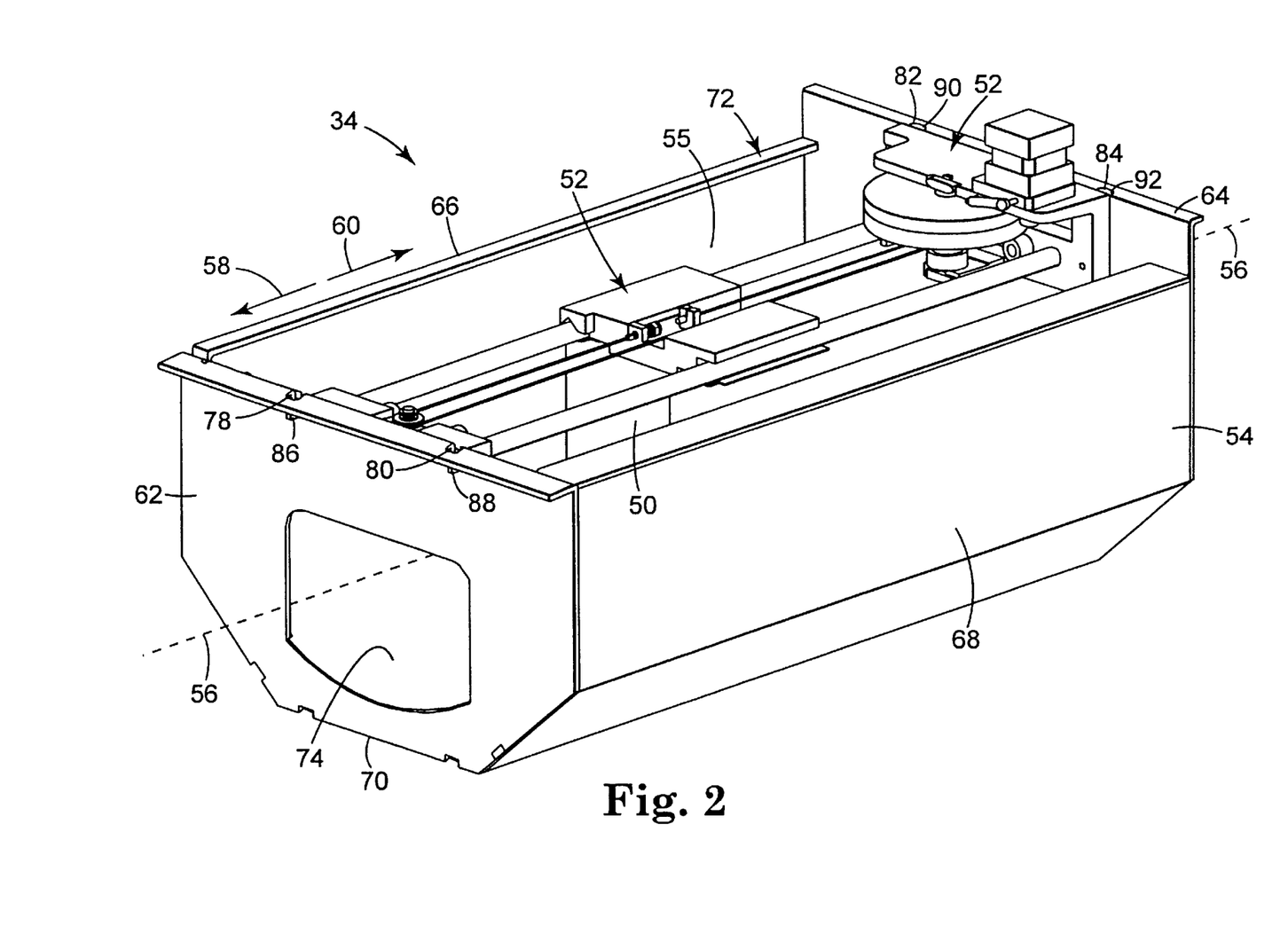
FIG. 2 is a perspective view of an exemplary film exposure assembly having a linear translation system for use in a laser imaging apparatus, in accordance with the present invention.

In FIG. 2, a top perspective view of one exemplary embodiment of the film exposure assembly 34 including a linear translation system in accordance with the present invention is shown. The film exposure assembly 34 has an internal-drum type configuration. In the exemplary embodiment shown, the film exposure assembly 34 includes an optical scanner assembly 50 (best shown in FIG. 4) mechanically coupled to a linear translation system 52, mounted within drum frame 54 for exposure of the film. The center of curvature of the internal drum surface 55, which is located along the drum longitudinal axis, is indicated by dashed line 56. During a scanning process, the optics translation system 52 operates to move the optical scanner assembly 50 along the longitudinal axis 56 (in a direction generally perpendicular to the scanning direction), indicated by directional arrow 58, and after scanning, returns the optical scanner assembly 50 to a start position, along the longitudinal axis 56, indicated by directional arrow 60. The unique linear translation system for moving an optical scanner assembly, in accordance with the present invention, minimizes velocity variations in the system, allowing for "continuous scan" or "continuous step-scan" laser scanning operation.

In one exemplary embodiment shown, drum frame 54 is constructed of sheet steel, and includes a first end 62, a second end 64, a first side 66, a second side 68, a bottom 70, and a top 72. A film platen 74 is positioned within the drum frame 54, and includes internal drum surface 55. The internal drum surface 55 provides a cylindrical or partially cylindrically-shaped scanning surface.

The linear translation system 52 extends along the top 72 for positioning the optical scanner assembly 50 along the center of curvature, indicated as longitudinal axis 56. In particular, the linear translation system 52 is positioned between the first end 62 and the second end 64. First end 62 and second end 64 include slots for easy mounting, installation and removal of linear translation system 52 within the drum frame 54.

In particular, the first end 62 includes a first mounting slot 78 and a second mounting slot 80, and second end 64 includes a third mounting slot 82 and a fourth mounting slot 84. The linear translation system 52 includes support pins 86, 88, 90, 92 extending from each end in alignment with slots 78, 80, 82, 84. Support pins 86, 88, 90, 92 are positioned within corresponding mounting notches or slots 78, 80, 82, 84 for supporting the linear translation system 52 from the drum frame 54.

The location of the mounting slots or mounting notches can be unique to each specific drum frame. As such, a user may simply drop into place in the linear translation system 52 having optical scanner assembly 50 supported therefrom into the corresponding slots 78, 80, 82, 84, and the linear translation system 52 and optical scanner assembly 50 are aligned within the drum frame 54 relative to the film platen 74. The exact position of the notches are pre-aligned at time of manufacture for each linear translation system, and no further adjustment is necessary in the field.

Figure 3:
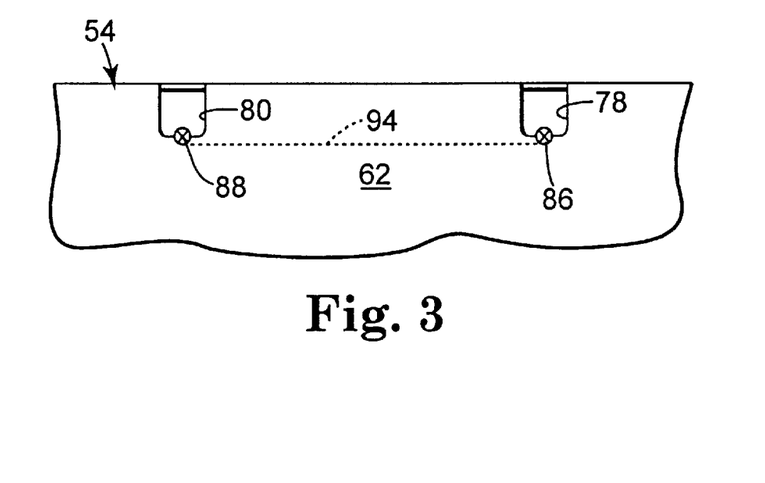
FIG. 3 is a partial view illustrating one exemplary embodiment of a frame having mounting slots for mounting a linear translation system in accordance with the present invention.

Referring to FIG. 3, an enlarged partial elevational view of first end 62 having first mounting slot 78 and second mounting slot 80 is shown. First support pin 86 and second support pin 88 are shown positioned within corresponding mounting slot 78 and second mounting slot 80. At each end (first end 62 and second end 64) one of the mounting slots further includes a reference notch. As shown, second mounting slot 80 includes reference notch 94. Reference notch 94 is sized for precisely fitting second support pin 88 therein. Reference notch 94 is used as a reference position for precisely locating second support pin 88 therein, and first support pin 86 is allowed to float within first mounting slot 78. As such, reference notch 94 is used as a reference position for locating the linear translation system 52 and optical scanner assembly 50 within the drum frame 54. Further, since first support pin 86 is allowed to float within first mounting slot 78, first support pin 86 compensates for any thermal gradients or any thermally-induced stresses. If the linear translation system 52 were totally fixed within the drum frame 54, such thermal gradients or thermally-induced stresses could distort the positioning and subsequent images exposed by the optical scanner assembly.

Figure 4:
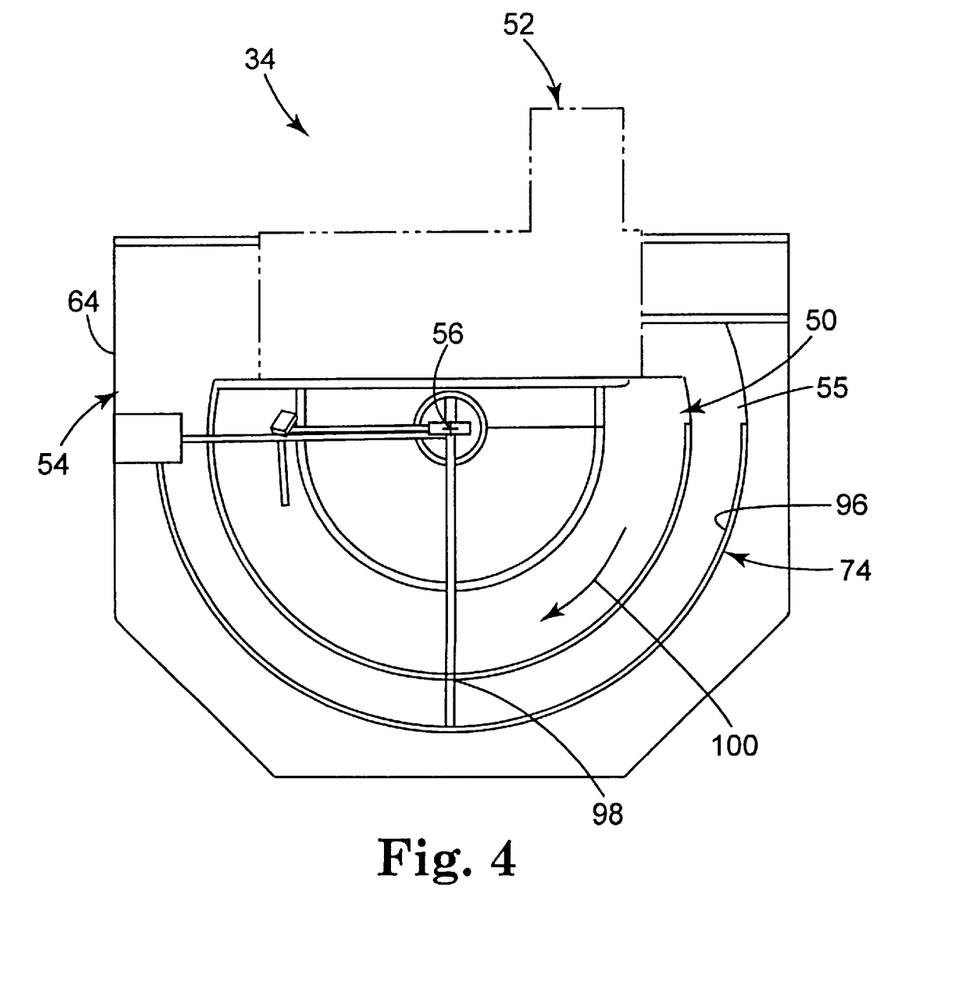
FIG. 4 is an end view of the film exposure assembly shown in FIG. 2.

Referring to FIG. 4, an end elevational view of the film exposure assembly 34 as shown, having a portion of the drum frame 54 removed for clarity. Optical scanner assembly 50 is shown mechanically coupled to the linear translation system 52, positioned along the center of curvature 56.

The above referenced optical scanner assembly incorporates a two-sided scanner mirror and novel optical lens configuration for scanning images about a scanned surface which are suitable for use in medical imaging applications.

A piece of photosensitive film 96 is shown positioned on the internal drum surface 55 of film platen 74. During exposure of the photosensitive film 96, the photosensitive film 96 is held against the internal drum surface 55, which has a cylindrical or partial cylindrical shaped.

In summary, the photosensitive film 96 is held against the film plate 74 of internal drum surface 55. The optical scanner assembly So scans a laser beam representative of an image to be exposed on the film, across the film scanning surface in an image-wise pattern. In particular, the scanning laser beam (indicated 98) emanates radially from the center of curvature 56 of the internal drum surface 55, which is located along the center of curvature longitudinal axis 56. The optical scanner assembly 50 scans the laser beam containing image data representative of the image to be exposed in raster lines by rotating about the longitudinal axis 56 of the cylinder drum (indicated by directional arrow 100). As the optical scanner assembly 50 scans the image and raster lines in an image-wise pattern across the photosensitive film 96 located on the internal drum surface 55, the linear translation system 52 moves the optical scanner assembly 50 along the center of curvature longitudinal axis 56 to expose a full image on the photosensitive film. The linear translation system 52 moves the optical scanner assembly 50 along the longitudinal axis 56 in a direction which is generally perpendicular to the scanning direction of laser beam 98. Since the linear translation system 52 moves the optical scanner assembly 50 during each scan line, the resulting scan lines are not perpendicular, but are "generally" perpendicular to the direction of movement of the linear translation system.

The unique linear translation system in accordance with the present invention allows an image to be continuously scanned onto the photosensitive film. In particular, the unique linear translation system in accordance with the present invention has minimal velocity variation such that linear translation system 52 can move the optical scanner assembly 50 along the center of curvature longitudinal axis 56 during scanning of a scan line by laser beam 98 across the surface of the photosensitive film 96.

In one exemplary embodiment, the film exposure area on the internal drum surface is 17 inches by 14 inches, suitable for exposure of a 17 inch by 14 inch piece of photosensitive film. In the exemplary embodiment disclosed herein, the film is exposed in a vertical direction. In particular, since the film is fed into the exposure module in the 14 inch direction and subsequently scanned in the 17 inch direction, the scanned raster lines appear in the vertical direction. The laser beam is scanned 180° (or greater than 180° across the internal drum surface, for exposure of 17 inches across the photosensitive film. The linear translation system moves the optical scanner assembly along the longitudinal axis located at the center of curvature of the internal drum surface for a distance of 14 inches, for full exposure of a desired image/images on the photosensitive film.

The photosensitive film can be a photosensitive film which is sensitive to laser beam light. In one exemplary embodiment, the film is a light sensitive photothermographic film having a polymer or paper base coated with an emulsion of dry silver or other heat sensitive material. One known film suitable for use in medical imaging processes with a film exposure system having a linear translation system in accordance with the present invention is commercially available under the trade name Dryview Imaging Film (DVB or DVC) manufactured by Imation Corp. of Oakdale, Minn.

Figure 5:
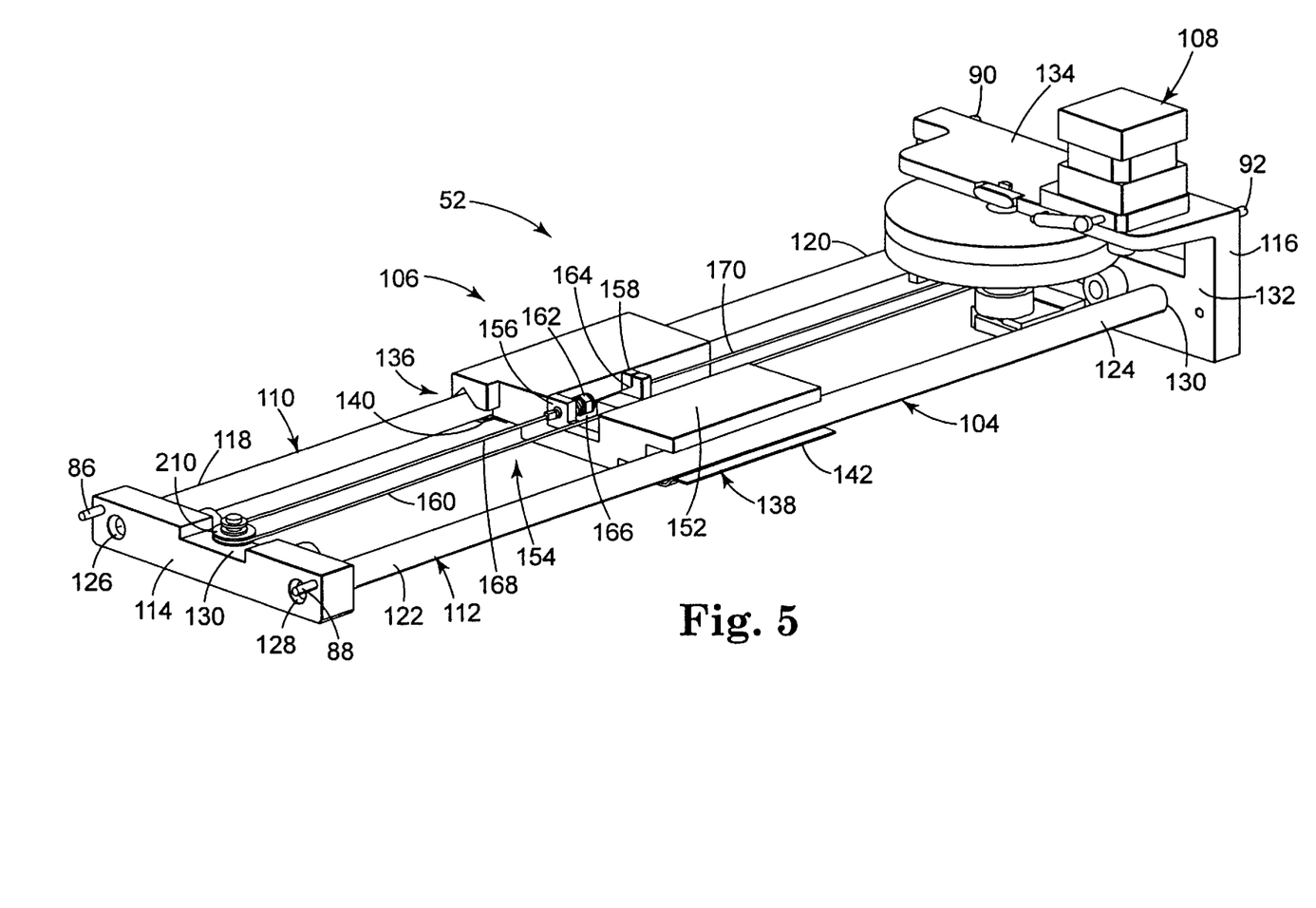
FIG. 5 is a perspective view of one exemplary embodiment of a linear translation system in accordance with the present invention.

Referring to FIG. 5, a perspective view of one exemplary embodiment of a linear translation system for use in a laser imaging system in accordance with the present invention is shown, removed from the drum frame 54. The linear translation system 52 is uniquely designed to minimize velocity variation, allowing continuous scanning or continuous step scanning of an image during a laser scanning process.

The linear translation system 52 includes a base member 104, a carriage mechanism 106, and a rotary to linear motion mechanism or drive mechanism 108. The base member 104 is mechanically coupled to and held stationary relative to the drum frame. The carriage mechanism 106 is carried by the base member 104. The carriage mechanism 106 is coupled to (and carries) the optical scanner assembly or laser imaging assembly. The rotary to linear motion mechanism 108 converts rotary motion to linear motion for moving the carriage mechanism 106 along the base member 104 during the scanning process.

Base member 104 includes a pair of longitudinally extending guide rails, indicated as first guide rail 110, and second guide rail 112, which are positioned parallel to each other. In one exemplary embodiment, the guide rails 110, 112 are polished stainless steel guide rails. Further, the guide rails may include a lubricating coating thereon. In one preferred embodiment, the guide rails 110, 112 are coated with polytetrafluoroethylene (PTFE) (commercially available under the tradename TEFLON). Base member 104 further includes a first base bracket 114 and second base bracket 116. First guide rail 110 and second guide rail 112 extend longitudinally between first base bracket 114 and second base bracket 116. In particular, first guide rail 110 includes a first end 118 and a second end 120 and second guide rail 112 includes a first end 122 and a second end 124. The first guide rail 110, first end 118 is fixedly coupled to first base bracket 114 (e.g., by tapping and screwing into the first base bracket indicated at 126), and second end 120 is fixedly coupled to the second base bracket 116 in a similar manner. Similarly, the second guide rail 112, first end 122, is fixedly coupled to the first base bracket 114 (indicated at 128) and the second end 124 is fixedly coupled to the second base bracket 116 (indicated at 130).

As previously described herein, first support pin 86 and second support pin 88 extend from first base bracket 114, and third support pin 90 and fourth support pin 92 extend from second base bracket 116. Further, first base bracket 114 includes recessed portion 130 which holds a portion of drive mechanism 108.

Second base bracket 116 is generally L-shaped, having a first leg 132, and second leg 134. The first guide rail 110 and the second guide rail 112 are fixedly coupled to the first leg 132. First leg 132 and second leg 134 are utilized as a support bracket for supporting and coupling other components of the rotary to linear motion mechanism 108, which will be described in detail later herein.

The carriage mechanism 106 is carried by the base member 104. In particular, the carriage mechanism 106 is coupled to the guide rails. Carriage mechanism 106 is slidably coupled to first guide rail 110, indicated at 136, and to second guide rail 112, indicated at 138. Carriage mechanism 106 is slidably coupled to first guide rail 110 and second guide rail 112 at three locations using a unique kinematic design. Carriage mechanism 106 may also include a first retaining bracket 140 and a second retaining bracket 142 to maintain the carriage mechanism 106 on the guide rails 110, 112 during shipping.

Carriage mechanism 106 includes carriage 152, and cable system 154. Carriage 152 includes a first termination bracket 156 and a second termination bracket 158. Cable system 154 includes cable 160, cable terminators 162, 164, and cable tensioner 166. In one exemplary embodiment, cable 160 is a stranded steel cable. The cable 160 has a first end 168 which passes through first cable termination bracket 156 and terminates at cable terminator 162, and has a second end 170 which passes through second termination bracket 158 and terminates at cable terminator 164. Further, cable tensioner 166 (e.g., a spring mechanism) is positioned between first cable terminator 162 and first termination bracket 156 to aid in maintaining tension in cable 160.

Figure 6:
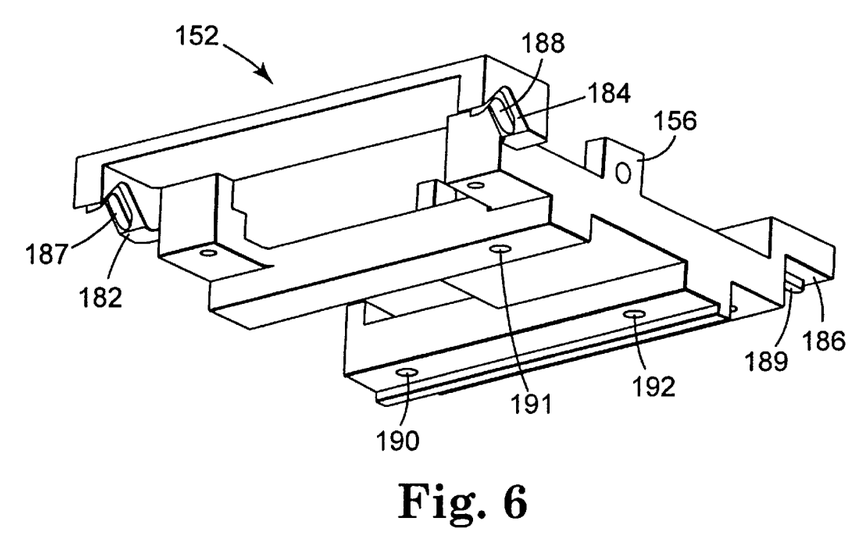
FIG. 6 is a perspective view illustrating an exemplary embodiment of a carriage for use with a linear translation system in accordance with the present invention.

Referring to FIG. 6, a bottom perspective view of one exemplary embodiment of carriage 152 is shown. In one preferred embodiment, carriage 152 is made of a material having increased mass properties, such as aluminum. It is also recognized that carriage 152 may be made of a lubricious polymeric material, which may be molded.

Carriage mechanism 106 has a kinematic design which allows the carriage 152 to ride on first guide rail 110 and second guide rail 112 at three locations. In particular, carriage 152 includes first bearing surface 182, second bearing surface 184, and third bearing surface 186. First bearing surface 182 and second bearing surface 184 are V-shaped. The third bearing surface 186 is flat. The first bearing surface 182 and second bearing surface 184 ride on first guide rail 110, and the third bearing surface 186 rides on second guide rail 112. As such, the carriage 152 contacts the first guide rail 110 and second guide rail 112 at five locations. In particular, the V-shaped first bearing surface 182 and second bearing surface 184 each contact first guide rail 110 at two points, and the third bearing surface 186, since it is flat, contacts the second guide rail 112 at one point. The use of the term "contacting at a point" herein includes contact between two surfaces at a small area or along a generally continuous line.

Further, first bearing surface 182, second bearing surface 184, and third bearing surface 186 may include a self-lubricating, wear-resistant polymeric coating, indicated at 187, 188, 189, to aid carriage mechanism 106 to easily slide or move along the guide rails 110, 112.

The carriage mechanism 106 serves as the interface between the rotary to linear motion mechanism 108 and the object being translated. In the laser imaging system of the present invention, the object being translated is the laser imager or optical scanner assembly 50. The optical scanner assembly 50 mounts beneath the carriage mechanism 106 at mounting locations 190, 191, and 192. Alignment of the optical scanner assembly 50 is achieved through the precision bearing surfaces 182, 184, 186 on the carriage 152. In particular, the V-shaped bearing surfaces, first bearing surface 182 and second bearing surface 184, and the flat bearing surface, third bearing surface 186, slide on the cylindrical guide rails 110, 112 while precisely maintaining the position of the carriage 152 in the direction perpendicular to the direction of motion. Further, the cable system 154 is somewhat forgiving if there is a slight misalignment between the carriage 152 and the cable 160, thereby keeping the bearing surfaces 182, 184, 186 in contact with the cylindrical guide rails 110, 112.

Figure 7:
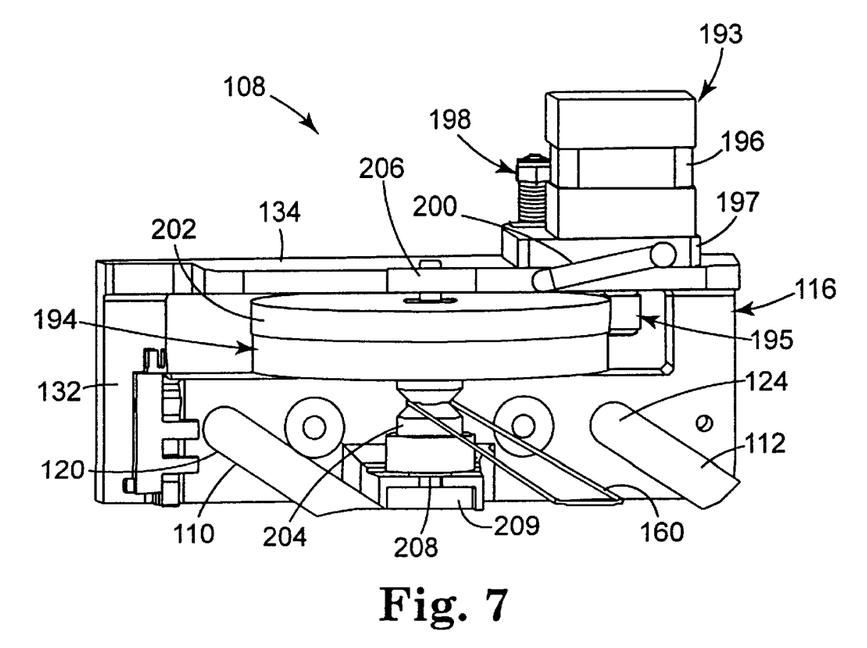
FIG. 7 is an elevational view illustrating a rotary to linear motion mechanism for use with a linear translation system in accordance with the present invention.

Referring to FIG. 7 (and also FIG. 5) an end elevational view illustrating the rotary to linear motion mechanism 108 (hereinafter referred to as drive mechanism 108) is shown. Drive mechanism 108 transforms rotary motion into the linear motion required by movement of the carriage system on the guide rails. Drive mechanism 108 includes a motor mechanism 193, the flywheel mechanism 194, and a capstan 195. Motor mechanism 193 includes motor 196, motor mount 197, compression mechanism 198, and extension mechanism 200. Flywheel mechanism 194 included flywheel 202 and cable drive pulley 204.

Motor 196 includes a rotating shaft which extends through the second base bracket 116, second leg 134.

Capstan mechanism 195 is coupled to the motor shaft. Compression mechanism 198 is coupled between motor 196 and motor mount 197. Extension mechanism 200 is coupled between motor mount 197 and second leg 134. Flywheel 202 includes a shaft 206 extending therefrom which is rotatably coupled to second leg 134, indicated at 206. Drive pulley 204 extends from a bottom surface of flywheel 202 and may be an integral part of flywheel 202.

Motor 196 is pivotally mounted with respect to second base bracket 116, second leg 134. The flywheel 202 is driven by motor 196 through the capstan 195. Capstan 195, mounted on the stepping motor shaft has a polyurethane cover which contacts the edge of the flywheel 202. The outside diameter of the capstan 195 is concentric to the motor 196. In particular, after the capstan mechanism 195 is mounted to the motor 196 shaft, the polyurethane cover is finish ground to remove any eccentricities due to the motor shaft and to minimize the runout of the capstan. The motor 196 and capstan mechanism 195 are then attached to the pivotal motor mount. The pivotal motor mount 197 is held down on the bracket second leg 134 through the compression mechanism 198 to minimize motor wobble. Further, nip pressure is created between the capstan mechanism 195 and the flywheel 202 by the extension mechanism 200.

In known linear translation systems, the motor shaft is directly coupled to the center shaft of the flywheel. In the unique embodiment in accordance with the present invention, the capstan mechanism 195 provides a gear reduction allowing the use of a higher speed motor. In one exemplary embodiment, the capstan mechanism 195 includes an aluminum core with a polyurethane coating. The polyurethane coating provides a compliant coating which grips the flywheel 202 as the motor 196 drives the flywheel 202 through the capstan 195. In one exemplary embodiment, the capstan has a diameter of 11.5 mm and the flywheel has a diameter of 101.4 mm, giving a gear reduction of about 8.8:1. The drive pulley has a diameter of 11.5 mm.

In exemplary embodiment, motor 196 is a NEMA 17 DC stepping motor. The motor moves in micro-step increments. For example, in one application, the DC motor rotates in 50 micro-steps per step or 10,000 micro-steps per revolution. It is recognized that other motors may be used, such as a DC servo type (brushed or brushless), but it is recognized that such motors are expensive relative to the National Electrical Manufacturers Association (NEMA) 17 DC stepping motor and require more extensive control systems.

Flywheel 202 adds inertia to the system to dampen out any artifacts that may be caused by the stepping motor 196. In one exemplary embodiment, flywheel 202 is made of a precision machined brass.

Drive pulley 204 is integrated with flywheel 202 and positioned along the flywheel axis of rotation. Drive pulley 204, in turn, has a shaft 208 extending therefrom which is rotatably coupled to second base bracket 116 indicated at bracket extension 209. Drive pulley 204 is generally hourglass-shaped providing a V groove for retaining cable 160. Referring also to FIG. 4, an idler pulley 210 is positioned at the opposite end of the linear translation system 52, coupled to first base bracket 114. Idler pulley 210 is also hourglass-shaped and includes a V groove for retaining cable 160. As such, cable 160 is maintained in tension from first cable termination bracket 156, around idler pulley 210, around drive pulley 204, and terminates at second cable termination bracket 158. The tension in cable 160 prevents the cable 160 from slipping during operation of the linear translation system 52.

Figure 8:
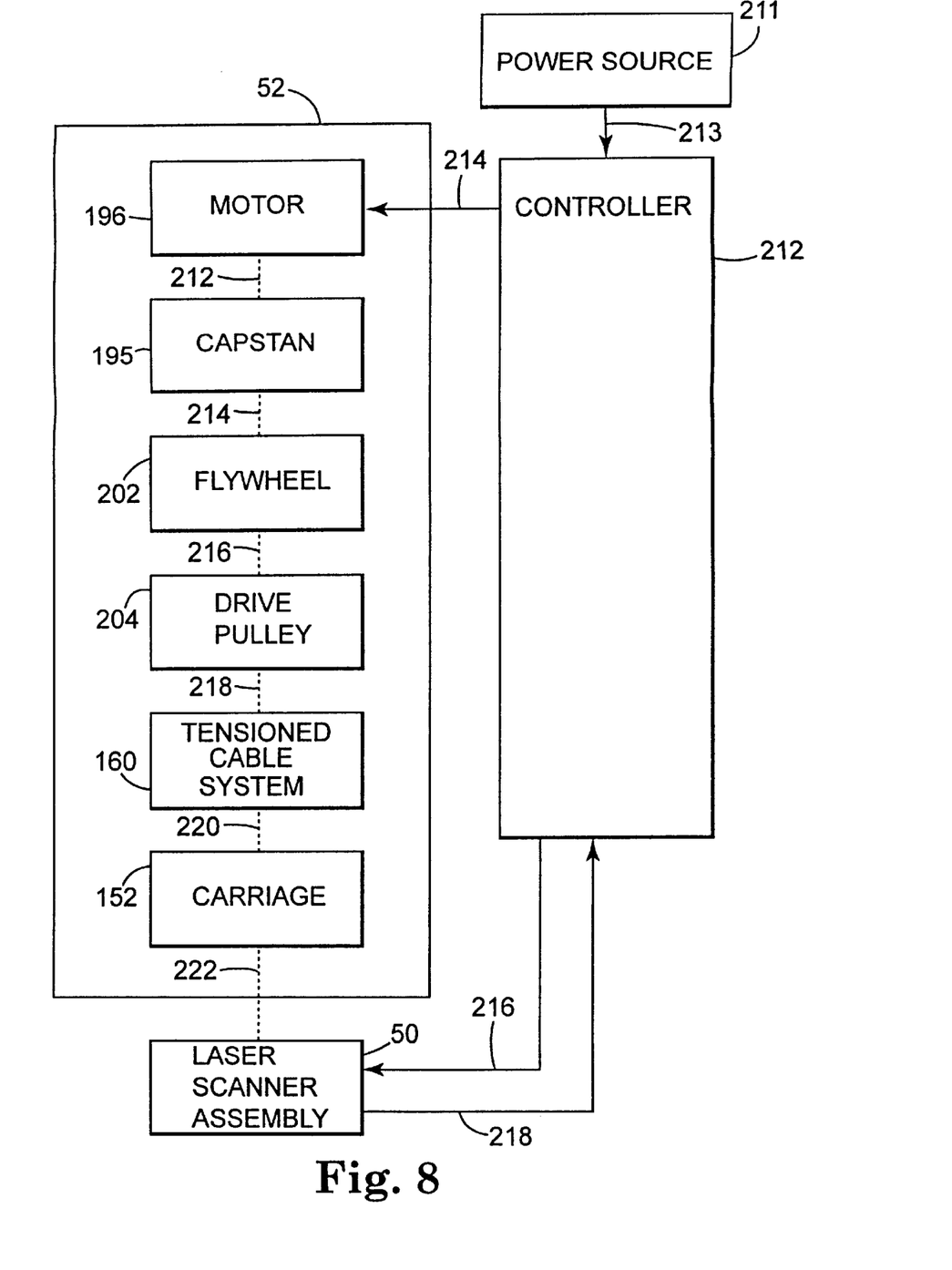
FIG. 8 is an operational block diagram illustrating an exemplary embodiment of operation of a film exposure system having a linear translation system in accordance with the present invention.

Referring to FIG. 8 (and also FIGS. 1–7), an operational block diagram illustrating an exemplary embodiment of operation of a film exposure system having a linear translation system in accordance with the present invention is shown. A controller 212 is coupled to a power source 211 (indicated at 213), and may be used for selective energization of motor 196, indicated at 214. Controller 212 may include a computer or microprocessor-based system, a sequence of logic gates, switches, or other mechanism capable of selective and controlled energization of motor 196. Further, controller 212 may be also utilized to receive and provide control signals for other parts of the laser imaging system, including providing and receiving control signals to/from laser scanner assembly 50, indicated at 216 and 218. Upon energization of motor 196, the motor shaft rotates which rotates the capstan 195 (indicated at 212). Compression mechanism 198 couples the motor 196 to the second base bracket 116 to minimize motor wobble. Extension mechanism 200 tensions capstan 195 against flywheel 192. As capstan 195 rotates and drives flywheel 202 (indicated at 214), capstan 195 provides a gear reduction between motor 196 and flywheel 202. Flywheel 202, in turn, rotates drive pulley 204 (indicated at 216), which may be integrated with flywheel 202.

Drive pulley 204 moves cable 174 (indicated at 218) tensioned between drive pulley 204 and idler pulley 210, converting rotational movement to linear movement. Cable 160 moves carriage 152 (indicated at 220) in a linear direction along first guide rail 110 and second guide rail 112. Since laser scanner assembly 50 is coupled to carriage 152 (indicated at 222), carriage 152 moves laser scanner assembly 50 along the longitudinal axis 56 located at the center of curvature as the laser scanner assembly 50 scans a scan line across a scanned surface in an image-wise fashion.

The linear translation system in accordance with the present invention has minimal velocity variation, allowing "continuous" scanning or "continuous micro-step" scanning of the laser scanner assembly 50. In one test performed on a linear translation system in accordance with the present invention, the velocity variation, $\Delta V/V_0$, of the system has been measured to be less than 0.5 percent. The positional accuracy has been measured to be less than 1 micrometer peak-to-peak over an 85 micrometer distance when continuously sampled.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A linear translation system for use in a laser imaging system, the linear translation system comprising:

a base member including a pair of longitudinally extending guide rails positioned parallel to each other;

a carriage mechanism carried by the base member, wherein the carriage mechanism is slidably coupled to the guide rails using a three position kinematic design;

a rotary to linear motion mechanism coupled to the carriage mechanism which slidably moves the carriage mechanism along the guide rails, wherein the rotary to linear motion mechanism includes a cable tensioning system; and a laser imaging assembly coupled to the carriage mechanism.

2. The system of claim 1, wherein the three position kinematic design includes the carriage mechanism contacting the guide rails at five points.

3. The system of claim 1, wherein the carriage mechanism includes a carriage body having a v-shaped bearing surface.

4. The system of claim 1, wherein the carriage mechanism includes a carriage body having a first bearing surface, a second bearing surface, and a third bearing surface for contacting the guide rails.

5. The system of claim 4, wherein the first bearing surface, the second bearing surface, and the third bearing surface include a lubricous polymeric coating.

6. The system of claim 4, wherein the first bearing surface and the second bearing surface are v-shaped.

7. The system of claim 4, wherein the pair of guide rails include a first guide rail and a second guide rail, and wherein the first bearing surface and the second bearing surface contact the first guide rail, and wherein the third bearing surface contacts the second guide rail.

8. The system of claim 4, wherein the third bearing surface is flat and contacts one of said pair of guide rails at a single point.

9. The system of claim 1, wherein the rotary to linear motion mechanism comprises:

a motor having a rotating shaft;

a flywheel mechanism; and a capstan coupled to said shaft and positioned between the shaft and the flywheel.

10. The system of claim 9, wherein the capstan is coupled to the shaft and tensioned against the flywheel mechanism.

11. The system of claim 10, further comprising a mechanism for tensioning the capstan against the flywheel mechanism.

12. The system of claim 9, wherein the base member further comprises a base bracket; and the system further comprises a motor mount, wherein the motor is mechanically coupled to the motor mount and the motor mount is pivotally coupled to the base bracket.

13. The system of claim 12, further comprising an extension mechanism coupled between the motor mount and the base bracket which tensions the capstan against the flywheel.

14. The system of claim 13, further comprising a compression mechanism coupled between the motor and the motor mount.

15. The system of claim 9, wherein said capstan is mounted on said shaft; and said capstan has a polymeric coating on at least a portion thereof.

16. The system of claim 9, the further comprising a drive pulley extending from the flywheel.

17. The system of claim 16, wherein the drive pulley is integral the flywheel.

18. The system of claim 16, further comprising a cable system mechanically coupled between the drive pulley and the carriage mechanism.

19. The system of claim 18, wherein the cable system includes a relatively stiff cable with a lubricious coating.

20. The system of claim 19, wherein the cable is made of steel, and the lubricious coating is polytetrafluoroethylene.

21. The system of claim 9, wherein the motor is a stepping motor.

22. The system of claim 9, wherein the laser imaging assembly scans a scan line across a scanned surface in a direction generally perpendicular to the movement of the carriage mechanism, and wherein the motor moves the carriage mechanism during each scan line.

23. The system of claim 22, wherein the motor is a stepping motor, and wherein the stepping motor moves the carriage mechanism a plurality of micro-steps during each scan line.

24. A laser imaging system having a linear translation system and a scanner assembly, wherein the linear translation system moves the scanner assembly across a scanned surface in a direction generally perpendicular to the scanning direction, the system comprising:

a base member including a pair of longitudinally extending guide rails positioned parallel to each other, the longitudinally extending guide rails defining a longitudinal axis therebetween;

a carriage mechanism carried by the base member, wherein the carriage mechanism slidably coupled to the guide rails using a kinematic design having five contact points; and a rotary to linear motion mechanism coupled to the carriage mechanism which slidably moves the carriage mechanism along the guide rails;

wherein the laser imaging assembly is coupled to the carriage mechanism between the carriage mechanism and the scanned surface, and wherein the laser imaging assembly scans a scan line across the scanned surface in an imagewise pattern, wherein the scan line is generally perpendicular to the movement of the carriage mechanism.

25. The system of claim 24, wherein the carriage system includes a first bearing surface, a second bearing surface, and a third bearing surface for contacting the guide rails.

26. The system of claim 25, wherein the first bearing surface and the second bearing surface are v-shaped.

27. The system of claim 26, wherein the third bearing surface is flat, and wherein the pair of longitudinally extending guide rails includes a first guide rail and a second guide rail, and wherein the first bearing surface and the second bearing surface contact the first guide rail, and wherein the third bearing surface contacts the second guide rail.

28. The system of claim 24, wherein the rotary to linear motion mechanism comprises:

a motor assembly having a rotating shaft; and a flywheel mechanism, wherein the rotating shaft drives the flywheel mechanism.

29. The system of claim 28, wherein the rotary to linear motion mechanism further comprises a capstan coupled to the rotating shaft, wherein the flywheel includes an outside edge, and wherein the capstan is tensioned against the flywheel outside edge.

30. The system of claim 29, wherein the capstan is cylindrically shaped and has a diameter less than the diameter of the flywheel.

31. The system of claim 29, wherein said capstan is cylindrically shaped and has a polymeric coating located about at least a portion thereof.

32. The system of claim 29, wherein the base member further comprises a base bracket, and the system further comprises a motor mount, wherein the motor assembly is mechanically coupled to the motor mount and the motor mount is pivotally coupled to the base bracket.

33. The system of claim 32, further comprising an extension mechanism coupled between the motor mount and the base bracket which tensions the capstan against the flywheel.

34. The system of claim 33, further comprising a compression mechanism coupled between the motor and the motor mount.

35. The system of claim 28, further comprising a drive pulley mechanism extending from the flywheel.

36. The system of claim 35, wherein the drive pulley mechanism is formed integral the flywheel.

37. The system of claim 36, further comprising a cable system operably connecting the pulley and the carriage system.

38. An internal drum type scanner assembly for use in a laser imaging system, the scanner assembly comprising:

a frame having a first end, a second end, and an internal drum shaped scanning surface for positioning a piece of photosensitive film thereon;

a linear translation system positioned above the scanning surface coupled to the frame, the linear translation system comprising a base member including a pair of parallel guide rails extending longitudinally between the first end and the second end; a carriage mechanism carried by the base member, wherein the carriage mechanism slidably coupled to the guide rails using a kinematic design having five contact points; a rotary to linear motion mechanism coupled to the carriage mechanism which precisely moves the carriage mechanism along the guide rails; and a laser imaging assembly, wherein the laser imaging assembly is coupled to the carriage mechanism between the carriage mechanism and the scanned surface, and wherein the laser imaging assembly scans a scan line across the photosensitive film in an imagewise pattern, wherein the scan line is generally perpendicular to the movement of the carriage mechanism.

39. The system of claim 38, further comprising wherein the pair of guide rails extend between a first base end bracket and a second base end bracket, and wherein the first base end bracket and the second base end bracket each have a pair support pins extending therefrom.

40. The system of claim 39, further comprising wherein the first end and the second end each include a pair of notches for slidable receipt of the support pins for supporting the linear translation system from the frame.

* * * * *